US012765726B2

(12) United States Patent
Stettes et al.

(10) Patent No.: US 12,765,726 B2
(45) Date of Patent: Oct. 20, 2026

(54) MULTIUSE FOOD STORAGE PAN HANDLING SYSTEM

(71) Applicant: Duke Manufacturing Co., St. Louis, MO (US)

(72) Inventors: Gregory G. Stettes, Pacific, MO (US); Tim Howard, St. Louis, MO (US)

(73) Assignee: Duke Manufacturing Co., St. Louis, MO (US)

( * ) Notice: Subject to any disclaimer, the term of this patent is extended or adjusted under 35 U.S.C. 154(b) by 1194 days.

(21) Appl. No.: 17/725,534

(22) Filed: Apr. 20, 2022

(65) Prior Publication Data

US 2022/0330761 A1 Oct. 20, 2022

Related U.S. Application Data

(60) Provisional application No. 63/177,138, filed on Apr. 20, 2021.

(51) Int. Cl.
*A47J 47/16* (2006.01)
*A47J 39/02* (2006.01)

(52) U.S. Cl.
CPC ............... *A47J 47/16* (2013.01); *A47J 39/02* (2013.01)

(58) Field of Classification Search
CPC ........ A47J 39/02; A47J 47/16; A47J 36/2483; A47J 36/2488; A47J 27/14; A21B 1/50
See application file for complete search history.

(56) References Cited

U.S. PATENT DOCUMENTS

| | | | |
|---|---|---|---|
| 1,496,099 | A | 6/1924 | O'Connor |
| 1,627,541 | A | 5/1927 | Katzinger |
| 1,820,070 | A | 8/1931 | Hippee |
| 2,076,091 | A | 4/1937 | O'Neill |
| 2,257,468 | A | 9/1941 | Langel |
| 2,415,825 | A | 2/1947 | Knuth |
| 2,517,725 | A | 8/1950 | Schweller |
| 2,763,526 | A | 9/1956 | Falek |
| 2,779,497 | A | 1/1957 | Kollman et al. |
| 2,813,653 | A | 11/1957 | Grossman |
| 2,816,809 | A | 12/1957 | Miller et al. |
| 2,964,609 | A | 12/1960 | Anoff |
| 3,051,582 | A | 8/1962 | Muckler et al. |
| 3,266,858 | A | 8/1966 | Klotz |

(Continued)

FOREIGN PATENT DOCUMENTS

| | | | |
|---|---|---|---|
| CA | 700459 | A | 12/1964 |
| EP | 2666396 | A2 | 11/2013 |

(Continued)

OTHER PUBLICATIONS

Brothers, U.S. Pat. No. 3,09,192 patented Dec. 16, 1884, 3 pages.

(Continued)

*Primary Examiner* — John J Norton
*Assistant Examiner* — Dilnessa B Belay
(74) *Attorney, Agent, or Firm* — Stinson LLP

(57) ABSTRACT

A food holding apparatus and associated components and methods. The food holding apparatus includes a food holding unit and at least one food pan transporter. A food pan is stowable in a food pan receiving location of the food holding apparatus. The food pan is moveable by the pan transporter into and out of the food pan receiving location.

19 Claims, 14 Drawing Sheets

(56) References Cited

U.S. PATENT DOCUMENTS

| | | | | |
|---|---|---|---|---|
| 3,295,904 | A | 1/1967 | Cobb | |
| 3,313,917 | A | 4/1967 | Ditzler et al. | |
| 3,353,885 | A | 11/1967 | Hanson | |
| 3,353,886 | A | 11/1967 | Tompkins | |
| 3,528,718 | A | 9/1970 | Johnson et al. | |
| 3,597,238 | A | 8/1971 | Scharre | |
| 3,601,582 | A | 8/1971 | Boisfleury | |
| 3,681,568 | A | 8/1972 | Schaefer | |
| 3,751,629 | A | 8/1973 | Eisler | |
| 3,752,640 | A | 8/1973 | Schneider | |
| 3,866,993 | A | 2/1975 | Dean et al. | |
| 3,870,387 | A | 3/1975 | Mortashed | |
| 3,874,552 | A | 4/1975 | Grimm | |
| 3,908,749 | A | 9/1975 | Williams | |
| 4,024,377 | A | 5/1977 | Henke | |
| 4,099,512 | A | 7/1978 | Noonan | |
| 4,110,587 | A | 8/1978 | Souder, Jr. et al. | |
| 4,149,518 | A | 4/1979 | Schmidt et al. | |
| 4,198,559 | A | 4/1980 | Walter et al. | |
| 4,235,282 | A | 11/1980 | de Filippis et al. | |
| 4,771,907 | A | 9/1988 | Torney | |
| 4,784,054 | A | 11/1988 | Karos et al. | |
| D308,497 | S | 6/1990 | Roche | |
| 4,967,995 | A | 11/1990 | Burgess | |
| D320,327 | S | 10/1991 | Hollins | |
| D326,795 | S | 6/1992 | Reitz | |
| 5,188,020 | A | 2/1993 | Buchnag | |
| 5,235,903 | A | 8/1993 | Tippmann | |
| 5,251,975 | A | 10/1993 | Braun et al. | |
| D347,360 | S | 5/1994 | Wheeler | |
| 5,365,038 | A | 11/1994 | Mitsugu | |
| 5,470,143 | A | 11/1995 | Gill | |
| 5,496,987 | A | 3/1996 | Siccardi et al. | |
| 5,607,213 | A | 3/1997 | Slivon et al. | |
| 5,653,905 | A | 8/1997 | McKinney | |
| 5,724,886 | A | 3/1998 | Ewald et al. | |
| 5,783,803 | A | 7/1998 | Robards, Jr. | |
| 5,828,547 | A | 10/1998 | Francovich et al. | |
| 5,852,967 | A | 12/1998 | Fortmann et al. | |
| 5,900,173 | A | 5/1999 | Robards, Jr. | |
| 5,947,012 | A | 9/1999 | Ewald et al. | |
| 6,011,243 | A | 1/2000 | Arnold et al. | |
| 6,031,208 | A | 2/2000 | Witt et al. | |
| 6,116,154 | A * | 9/2000 | Vaseloff | A47J 39/02 219/400 |
| 6,119,587 | A | 9/2000 | Ewald et al. | |
| 6,175,099 | B1 | 1/2001 | Shei et al. | |
| 6,209,447 | B1 | 4/2001 | Ewald et al. | |
| 6,262,394 | B1 | 7/2001 | Shei et al. | |
| 6,358,548 | B1 | 3/2002 | Ewald et al. | |
| 6,412,403 | B1 | 7/2002 | Veltrop | |
| 6,539,846 | B2 | 4/2003 | Citterio et al. | |
| 6,541,739 | B2 | 4/2003 | Shei et al. | |
| 6,637,322 | B2 | 10/2003 | Veltrop | |
| 6,657,167 | B2 | 12/2003 | Loveless | |
| 6,878,391 | B2 | 4/2005 | Veltrop | |
| 6,884,451 | B2 | 4/2005 | Veltrop | |
| D526,157 | S | 8/2006 | Laib et al. | |
| 7,105,779 | B2 | 9/2006 | Shei | |
| D538,588 | S | 3/2007 | Laib et al. | |
| 7,328,654 | B2 | 2/2008 | Shei | |
| 7,385,160 | B2 | 6/2008 | Jones | |
| D581,205 | S | 11/2008 | Simon et al. | |
| 7,446,282 | B2 | 11/2008 | Shei et al. | |
| D584,612 | S | 1/2009 | Ianello | |
| D586,623 | S | 2/2009 | Dunn | |
| 7,661,553 | B2 | 2/2010 | Zeiron | |
| D613,113 | S | 4/2010 | Lippert et al. | |
| D619,829 | S | 7/2010 | Zalewski et al. | |
| 7,762,636 | B2 | 7/2010 | Veeser et al. | |
| D620,765 | S | 8/2010 | Sudia | |
| D620,766 | S | 8/2010 | Sudia | |
| D620,942 | S | 8/2010 | Huang | |
| 7,858,906 | B2 | 12/2010 | Veltrop et al. | |
| 7,971,523 | B2 | 7/2011 | Hartfelder et al. | |
| 8,076,616 | B2 | 12/2011 | Stanger | |
| 8,091,472 | B2 | 1/2012 | Maciejewski et al. | |
| 8,096,231 | B2 | 1/2012 | Veltrop et al. | |
| D664,149 | S | 7/2012 | Crisp et al. | |
| 8,404,292 | B2 | 3/2013 | Veltrop et al. | |
| D704,511 | S | 5/2014 | Beckman et al. | |
| D718,086 | S | 11/2014 | Lewis et al. | |
| D719,956 | S | 12/2014 | Akana et al. | |
| D728,991 | S | 5/2015 | Hasegawa | |
| 9,068,768 | B2 | 6/2015 | Veltrop | |
| 9,693,655 | B2 | 7/2017 | Shei et al. | |
| 9,788,652 | B2 | 10/2017 | Greer | |
| 9,844,301 | B2 | 12/2017 | Shields et al. | |
| 9,901,212 | B2 | 2/2018 | Stanger | |
| 10,258,197 | B1 | 4/2019 | Fortmann et al. | |
| 2001/0007322 | A1 | 7/2001 | Shei et al. | |
| 2004/0217116 | A1 | 11/2004 | Offerman et al. | |
| 2005/0088069 | A1 | 4/2005 | Greenwald et al. | |
| 2007/0035920 | A1 | 2/2007 | Peng et al. | |
| 2008/0007147 | A1 | 1/2008 | Skog | |
| 2008/0053983 | A1 | 3/2008 | Stanger | |
| 2009/0199723 | A1 | 8/2009 | Veltrop et al. | |
| 2009/0199725 | A1 | 8/2009 | Veltrop et al. | |
| 2009/0266244 | A1 | 10/2009 | Maciejewski et al. | |
| 2012/0076903 | A1 | 3/2012 | Maciejewski et al. | |
| 2013/0278124 | A1 | 10/2013 | Hu | |
| 2013/0300276 | A1 | 11/2013 | Nuss | |
| 2014/0144334 | A1 | 5/2014 | Reese et al. | |
| 2014/0263269 | A1 | 9/2014 | Veltrop et al. | |
| 2015/0102717 | A1 | 4/2015 | Furr et al. | |
| 2015/0253065 | A1 | 9/2015 | Min et al. | |
| 2016/0073821 | A1 * | 3/2016 | Shei | A47J 36/34 220/573.1 |

FOREIGN PATENT DOCUMENTS

| | | |
|---|---|---|
| GB | 616570 | 1/1949 |
| GB | 829729 | 3/1960 |
| JP | 2014173832 A * | 9/2014 |
| WO | 00/57709 | 10/2000 |
| WO | 2007/047597 A2 | 4/2007 |

OTHER PUBLICATIONS

Hunt, U.S. Pat. No. 4,66,416 patented Jan. 5, 1892, 3 pages.
Simmons, U.S. Pat. No. 6,88,010 patented Dec. 3, 1901, 3 pages.
Monsen et al., U.S. Pat. No. 7,40,677 patented Oct. 6, 1903, 3 pages.
Favorite et al., U.S. Pat. No. 8,04,110 patented Nov. 7, 1905, 4 pages.

* cited by examiner

MULTIUSE FOOD STORAGE PAN HANDLING SYSTEM

CROSS-REFERENCE TO RELATED APPLICATION

The present application claims priority to U.S. Provisional Patent App. No. 63/177,138, filed Apr. 20, 2021, which is hereby incorporated by reference in its entirety.

FIELD

The present disclosure generally relates to food preparation and serving equipment, and more particularly to a system for handling pans for storing food.

BACKGROUND

In the quick service food industry, large quantities of food are processed quickly. To efficiently serve customers, some food or portions thereof are precooked before an order for the food is entered. The precooked food is stored in a way to maintain desired properties of the food. For example, the food can be held in what is commonly referred to a food holding unit that can heat and/or cool food in the unit. Food can be temporarily held in pans stored in the unit prior to use in filling a customer order.

SUMMARY

In one aspect, a food holding apparatus comprises a food holding unit including a pair of supports and a floor. The food holding apparatus includes a pan transporter configured to be supported by the pair of supports. The food holding apparatus includes a pan configured to be disposed in the pan transporter such that movement of the pan transporter relative to the food holding unit results in corresponding movement of the pan relative to the holding unit.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

The food holding apparatus 80 of the present disclosure can be used to store various types of food. For example, the food holding apparatus 80 can be used to store partially cooked or precooked food before serving the food to customers. The food holding apparatus can be used to store the food to preserve desired properties of the food such as moisture, temperature, or texture (e.g., crispiness). In the illustrated embodiment, the food holding apparatus 80 is configured to heat the food as it is stored. However, the food can be unheated (e.g., ambient temperature), or cooled, without departing from the scope of the present disclosure.

Figure 1:
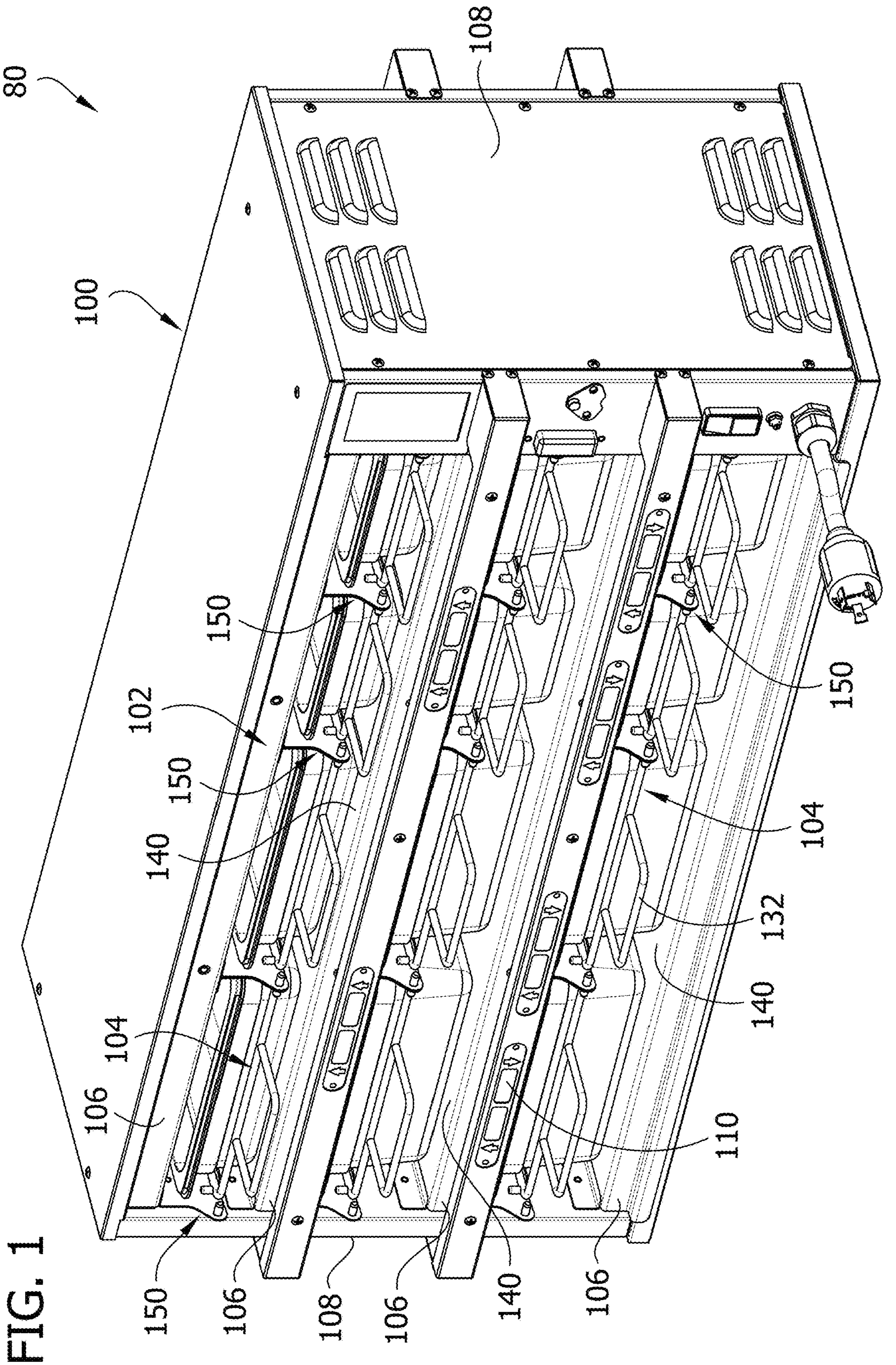
FIG. 1 is a perspective of a food holding apparatus of the present disclosure.

Referring to FIG. 1, the food holding apparatus 80 includes a food holding unit 100 and a plurality of food pans 102 stowable in food pan holding locations of the food holding unit. The food holding apparatus 80 further includes a plurality of food pan transporters configured to facilitate movement of the food pans 102 into and out of the food pan holding locations. As will become apparent, the food pan transporters 104 are removable from the food holding unit 100, and the pans 102 are removable from the food pan transporters. Generally, pans 102 are removed from the holding unit 100 to discard old food or to move the food to another holding location. Pans 102 are entered into the holding unit 100 to supply new food for storage. The pan transporters 104 generally remain at least partially in the food holding unit 100 but are completely removable from the food holding unit for cleaning or maintenance, etc. Other configurations and methods of use can be used without departing from the scope of the present disclosure.

Employees of a food service establishment using the food holding apparatus 80 will typically need to access food stored therein quickly and repeatedly. The food holding apparatus 80 is configured to facilitate efficient access to food stored therein. For example, a user can access a certain type of food held in a pan 102 in the food holding unit 100 by pulling the pan out like a drawer by manipulation of the corresponding food pan transporter 104. As will be explained in further detail below, the food pan transporter 104 interacts with support structure of the food holding unit 100 to define a stowed or home position of the transporter and the pan 102 in the food holding unit, and to limit movement of the transporter and pan out of the food holding unit to prevent the transporter and pan from falling out of the food holding unit. The arrangement is such that when the transporter 104 and pan 102 are pulled out like a drawer, the user can access the storage compartment of the pan for unloading and/or loading food and the user can return the transporter and pan back to the stowed position. In the illustrated embodiment, the food holding unit 100 is configured to permit access to the pans from the front side and the rear side of the holding unit (e.g., "pass through") and the food holding apparatus 80 is configured to provide functionality of the pull-out pan transporters and pans in a similar fashion on both the front and rear sides.

The food holding unit 100 can be configured to provide a plurality of food holding locations in an array including multiple columns and rows. In the illustrated embodiment, the pans 102 can be stored on three separate levels or shelves 106 of the food holding unit 100. The holding unit is configured to receive pans 102 having different heights and widths. A pan 102 having a full height/full width is shown at 102A. A pan having a full height/half width pan is shown at 102B. A half height/full width pan is shown at 102C. A half height/half width pan is shown at 102D. In the illustrated embodiment, the pans 102 do not include a lid, thus allowing moisture to escape from the pan to preserve crispiness of the food items. Other configurations can be used without departing form the scope of the present disclosure. For example, other numbers of levels (e.g., 1, 4, 5, etc.), and other arrangements (e.g., same sized pans and/or pans including lids) can be used.

The food holding unit 100 comprises a cabinet including left and right upstanding side walls 108 and the plurality of shelves 106 extending therebetween. One or more user interfaces 110, such as one for each holding location, can be provided to permit the user to manipulate holding conditions and other functions of the holding unit. For example, the user interface can include components such as displays, indicators, actuators (e.g., buttons), etc. The user interfaces 110 can display information about the temperature and/or other conditions of the food holding locations and may allow a user to adjust settings (e.g., temperature) of the holding unit. The shelves 106 further comprise heaters 112 (FIG. 2) to heat the pans. In one embodiment, the top most shelf 106 includes heaters 112 oriented to emit heat downward, the lower most shelf 106 includes heaters 112 oriented to emit heat upward, and the middle shelves 106 include heaters 112 oriented to emit heat downward and heaters 112 oriented to emit heat upward. Desirably, a pair of heaters (an upper heater 112 and a lower heater 112) is provided for each food holding location. Thus, the pans 102 can be heated from above and/or below. For example, the heaters 112 can comprise resistance heating elements, infrared heating elements, or other types of heating elements. Other configurations can be used without departing from the scope of the present disclosure. For example, heaters can be omitted.

Figure 3:
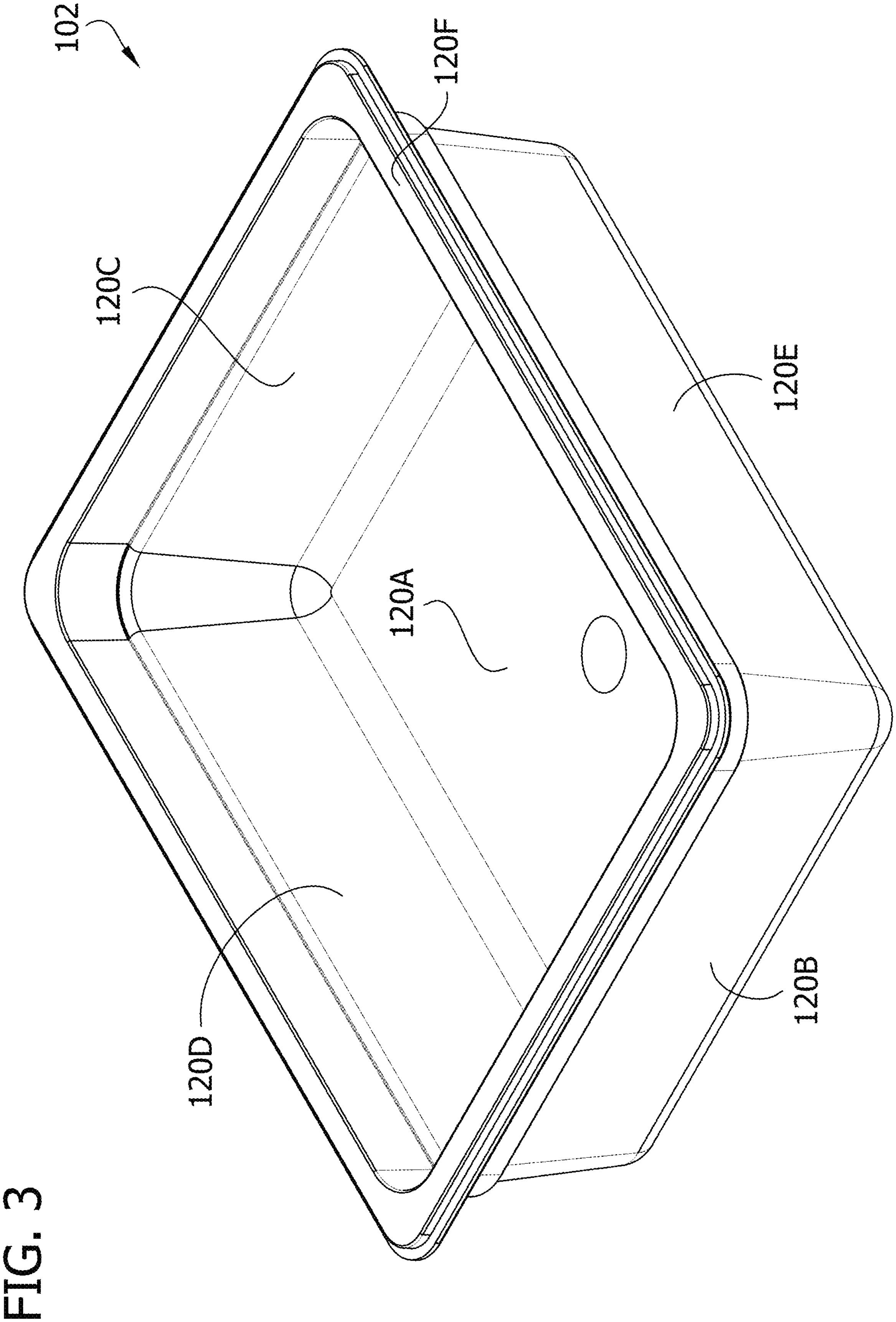
FIG. 3 is a perspective of a pan of the food holding apparatus.

An example food pan 102 is shown in FIG. 3. The food pan 102 includes a pan body comprising a bottom wall 120A, front and rear walls 120B, 120C, and left and right walls 120D, 120E. The pan body bounds an interior of the pan for holding food therein. The pan includes a rim 120F extending around an upper mouth of the pan.

Figure 4:
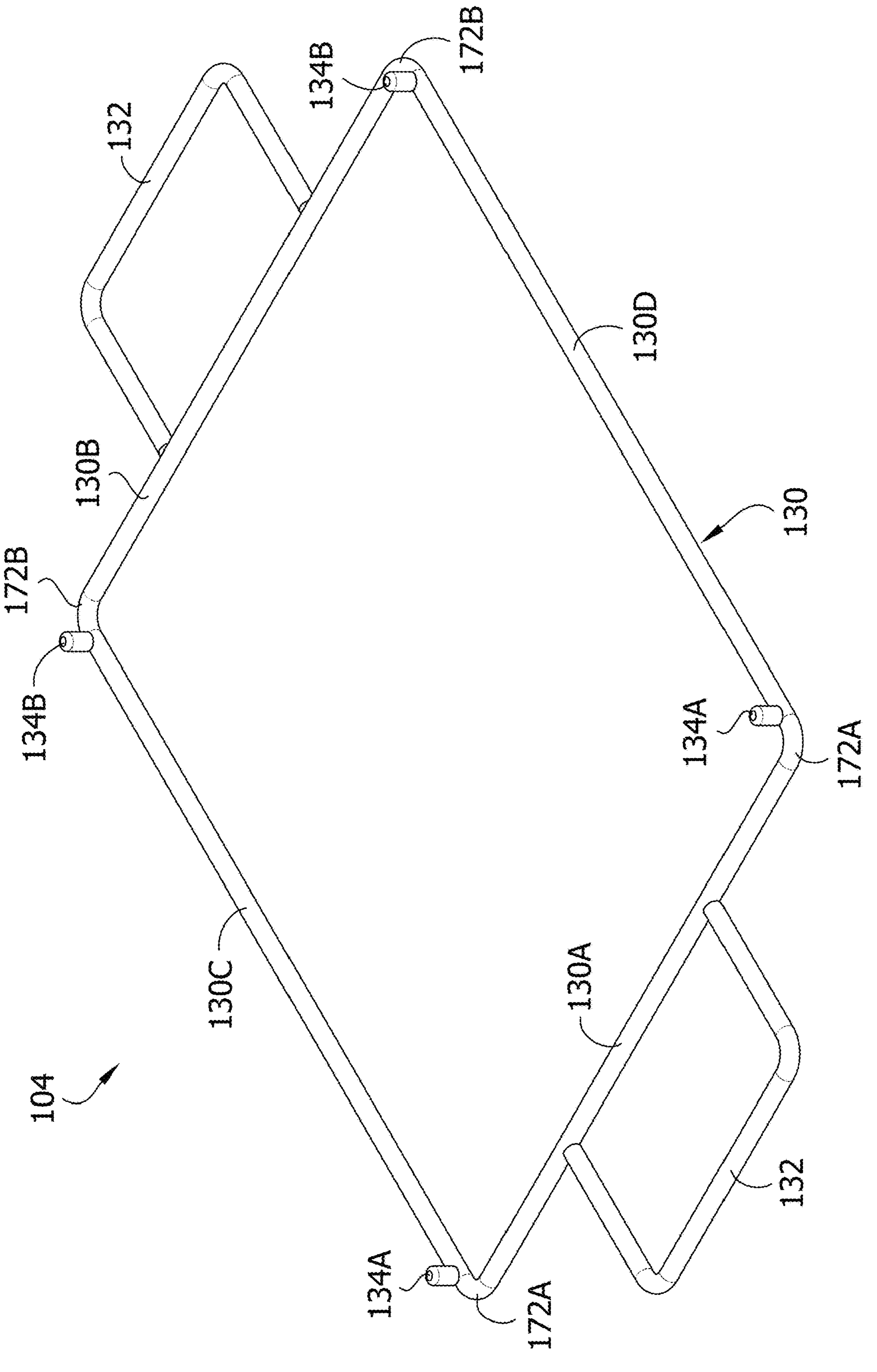
FIG. 4 is a perspective of a pan transporter of the food holding apparatus.

Referring to FIG. 4, a pan transporter 104 comprises a transporter body 130, two handles 132, and four transporter stops 134A, 134B. In the illustrated embodiment, the transporter body 130 comprises a rectangle of wire bent and welded to form a frame defining an opening sized and shaped to receive a pan 102. The transporter body includes front and rear body portions 130A, 130B extending widthwise of the transporter body, and left and right body portions 130C, 130D extending lengthwise of the transporter body. The transporter stops 134A, 134B comprise rods (broadly, "bosses") protruding upward from and having free upper ends above the transporter body. The stops 134A, 134B define respective engagement surfaces configured to engage corresponding structure of the food holding unit, as will become apparent. In one example, the transporter body can be formed of a single metal wire configured (e.g., by bending) to extend around a specific pan type. In one aspect of the transporter 104, the handles 132 are lower than the transporter stops 134A, 134B. The simple design of the pan transporter 104 makes it simpler to manufacture and easy to clean. Other configurations can be used without departing from the scope of the present disclosure. As explained in further detail below, the pan transporter 104 is configured to interact with support structure of the food holding unit 100 to facilitate movement of the pan 102 with respect to the food holding unit.

As shown in FIG. 1, each shelf 106 defines a generally planar support surface or floor 140 which defines bottoms of the respective food holding locations. In the illustrated embodiment, the floor 140 extends generally the entire width of a pan holding level, and segments of the floor are associated with different food holding locations. The arrangement is such that there are no components or elements on the floor 140 or that protrude upward from the floor. When the pans 102 are removed from the holding unit 100, the floor 140 is unobstructed to facilitate cleaning of the floor. For example, a damp cloth can be wiped across the entire width of the floor.

Figure 2:
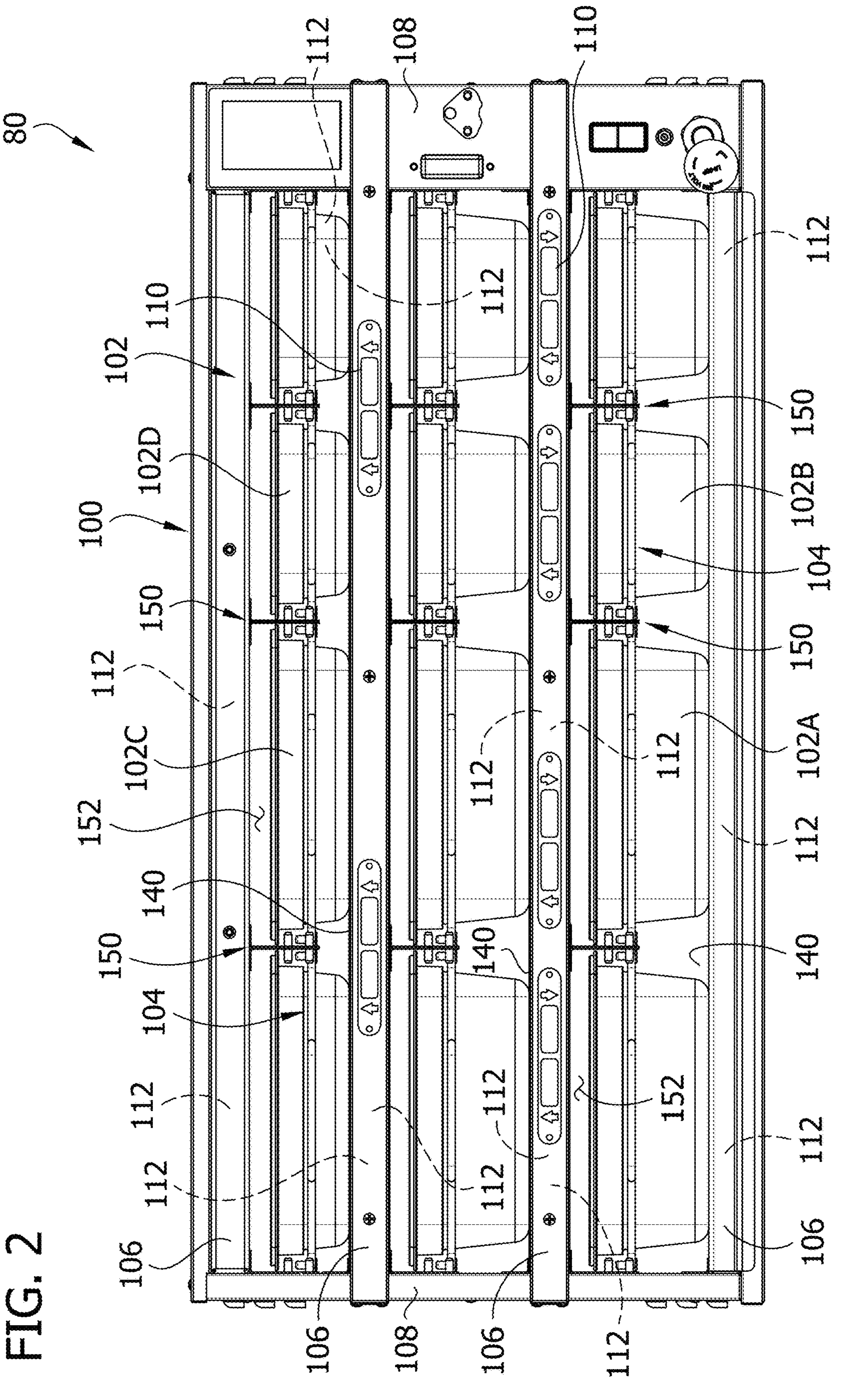
FIG. 2 is a front view thereof.

The food holding unit 100 includes supports 150 for supporting the pan transporters 104 in the food holding unit. The supports 150 are suspended from the shelves 106 and are spaced above the floor 140 of the respective pan holding location. As illustrated in FIGS. 1 and 2, the bottom of the shelves 106 forms a ceiling bounding the top of the food holding locations, the supports 150 being suspended from the ceiling. The spacing of the supports 150 above the floor 140 allows for the floors to be cleaned more easily. The supports 150 are spaced apart from each other to form pan channels 152 partially defining the food holding locations. The pan channels 152 are sized and shaped to correspond to the size and shape of the pan 102 that is intended to be inserted in that pan channel. As mentioned above, pans 102 come in set sizes, so the pan channels 152 are sized to correspond to a particular size of pan or pans. In one aspect, the supports 150 can serve as partitions that separate pan holding locations from each other and obstruct the pans 102 from moving laterally from one location to another.

Figure 5:
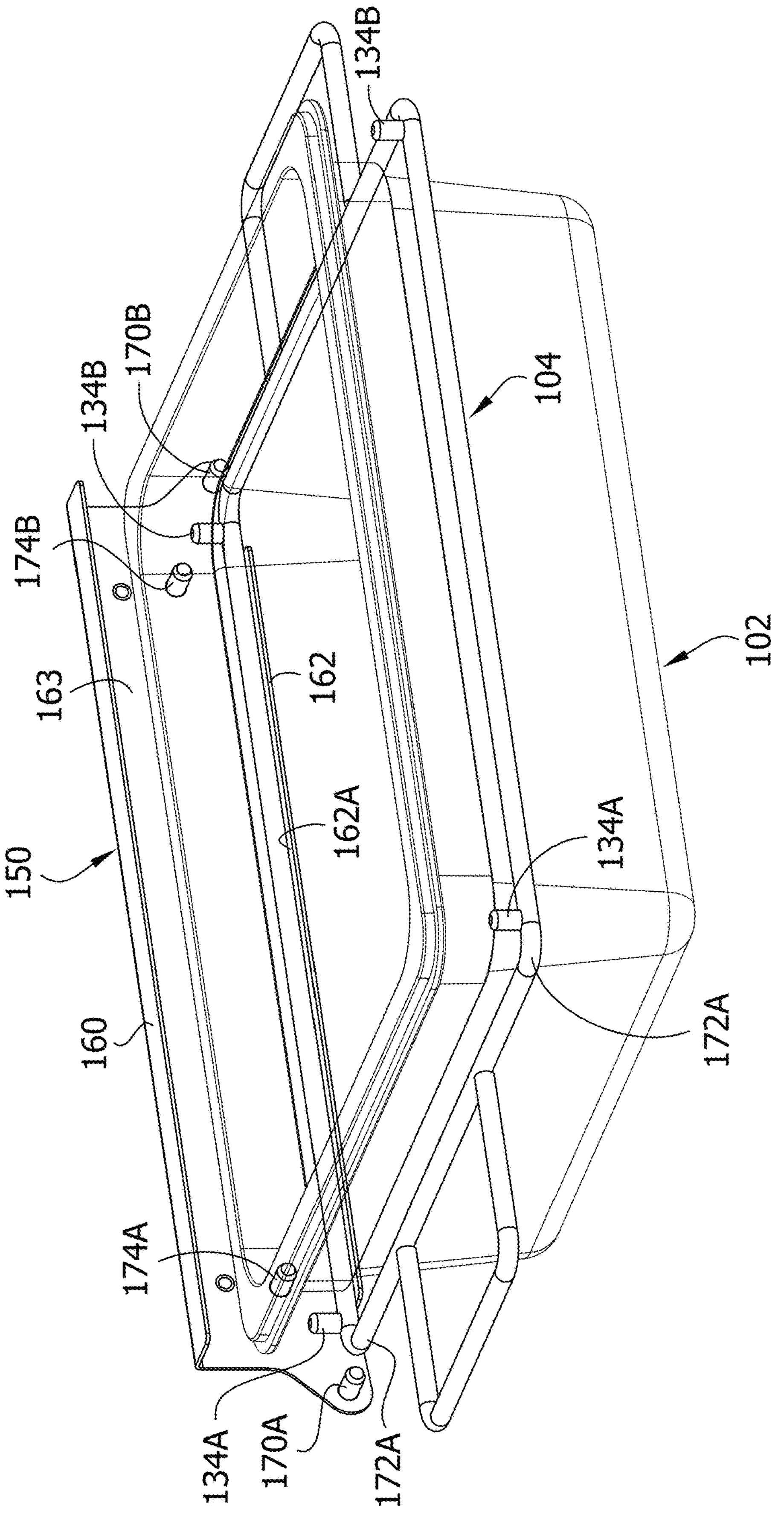
FIG. 5 is a perspective of the pan transporter and the pan in a stowed or home position in a food holding unit of the food holding apparatus, a support of the food holding unit being shown with the pan and food transporter.

Each pan holding location is defined in part by a pair of the supports 150. In the illustrated embodiment, some supports 150 act as supports for pan holding locations on left and right sides of the supports. The pan transporters 104 are configured to be supported on the supports 150 to situate the pan transporters in the pan channels 152 (FIG. 2) corresponding to the pan size. The left and right sides of the pan transporter 104 are supported by a support 150. When a pan 102 is situated in the stowed position in a pan storage location the pan is in a pan transporter 104. Such an arrangement is shown in FIG. 5. The pan 102 is shown as transparent to show features behind the pan. It will be understood that although only one support 150 is shown in FIG. 5, a second support (on the right side of the transporter) is hidden from view. The second support 150 would have essentially the same construction (e.g., a mirror image thereof) of the support illustrated in FIG. 5.

The support 150 comprises a support body (e.g., made of bent sheet metal) including an upper flange 160 and a lower flange 162 and a web 163 extending therebetween. The upper flange 160 (broadly, "mount") includes holes through which fasteners (e.g., rivets) can be inserted to secure (e.g., irremovably fix (without tools)) the support to the shelves 106. The web 163 forms a partition between pan holding locations and serves as mounting structure for stops of the support 150 that protrude inward from the web. The lower flange 162 defines a support rail configured to support the pan transporter. The lower flange has an upwardly facing transporter support surface 162A on which a transporter rests when in the stowed position and on which the transporter slides when the transporter is being moved into or out of the stowed position. In the illustrated embodiment, when the pan 102 is in a pan holding location in the holding unit 100, the pan transporter 104 does not carry the pan 102 above the floor. Instead, the pan 102 rests on and is supported by the floor 140. In other embodiments, the pan transporter 104 may be configured to carry the pan 102. It will be appreciated that the contact of the bottom of the pan 102 with the floor 140 facilitates conductive heat transfer from the floor to the pan.

Each support 150 includes stow stops 170A, 170B configured to position the pan transporter 104 and pan 102 in the stowed position. Each support 150 includes a front stow stop 170A and a rear stow stop 170B. In the illustrated embodiment, the stow stops 170A, 170B are above the flange 162 and support surface 162A. In the stowed position, the pan transporter 104 is positioned between the front and rear stow stops 170A, 170B. The stow stops are arranged to limit forward and rearward movement of the pan transporter 104 (and by extension the pan 102). The forward stow stop 170A engages the pan transporter 104 to stop forward movement, and the rear stow stop 170B engages the pan transporter to stop rearward movement. The stow stops 170A, 170B are arranged such that when the pan transporter 104 is therebetween, the stops are generally horizontally aligned (e.g., co-planar) with at least a portion of the pan transporter 104, such that the pan transporter will contact the stops and be inhibited from further movement if the pan transporter is moved in a forward or rearward direction. In the illustrated embodiment, left and right segments 172A, 172B of the front and rear portions 130A, 130B of the transporter body 130 define stop engagement surfaces arranged to engage the stow stops 170A, 170B, respectively. Thus, in the stowed position, the pan transporter 104 and pan 102 are secured in the holding unit 100. For example, the stow stops 170A, 170B can be located to cause the stop engagement surfaces 172A, 172B of the transporter to tend to "wedge" under the stops when forced against the stops to prevent the transporter from camming over the top of the stow stops. In one aspect of the transporter 104, the handles 132 are arranged to be intersected by a common plane intersecting the stop engagement surfaces 172A, 172B.

Figure 6:
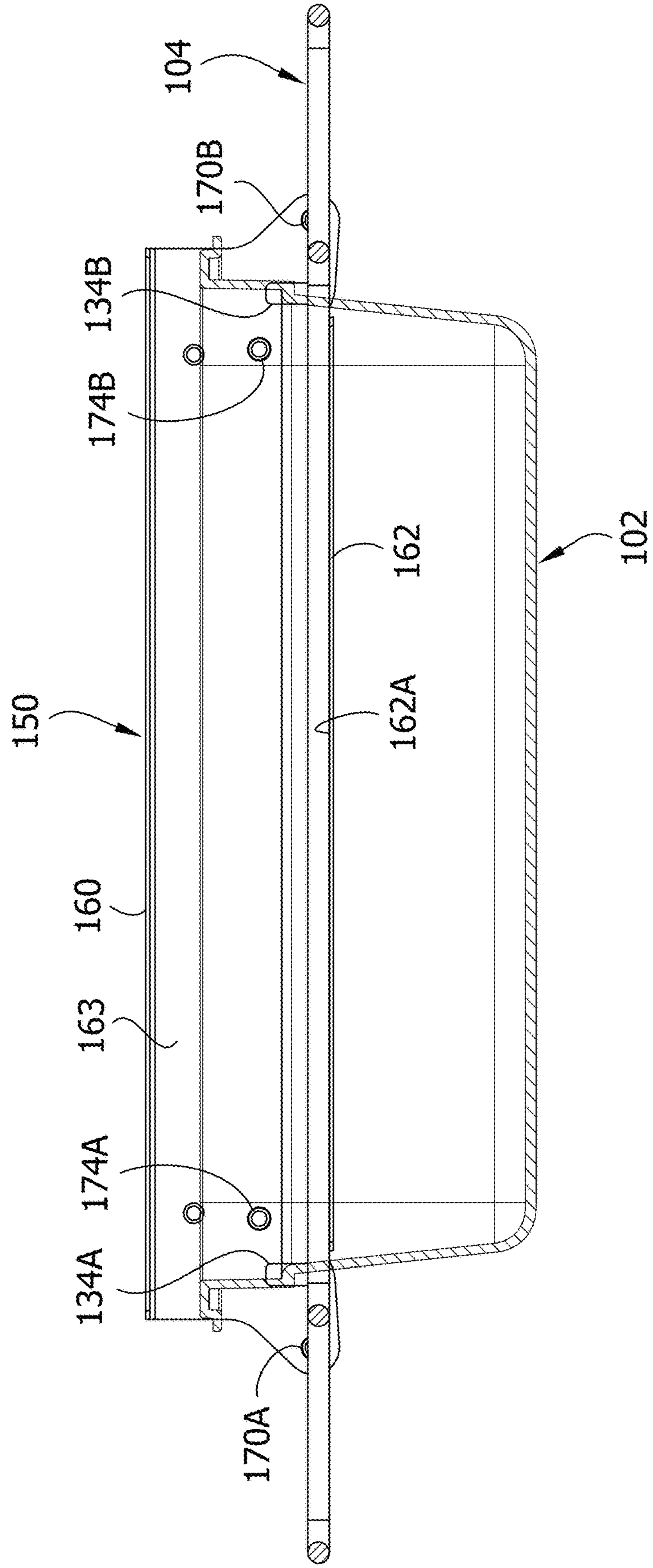
FIG. 6 is a cross-section taken through FIG. 4.
Figure 7:
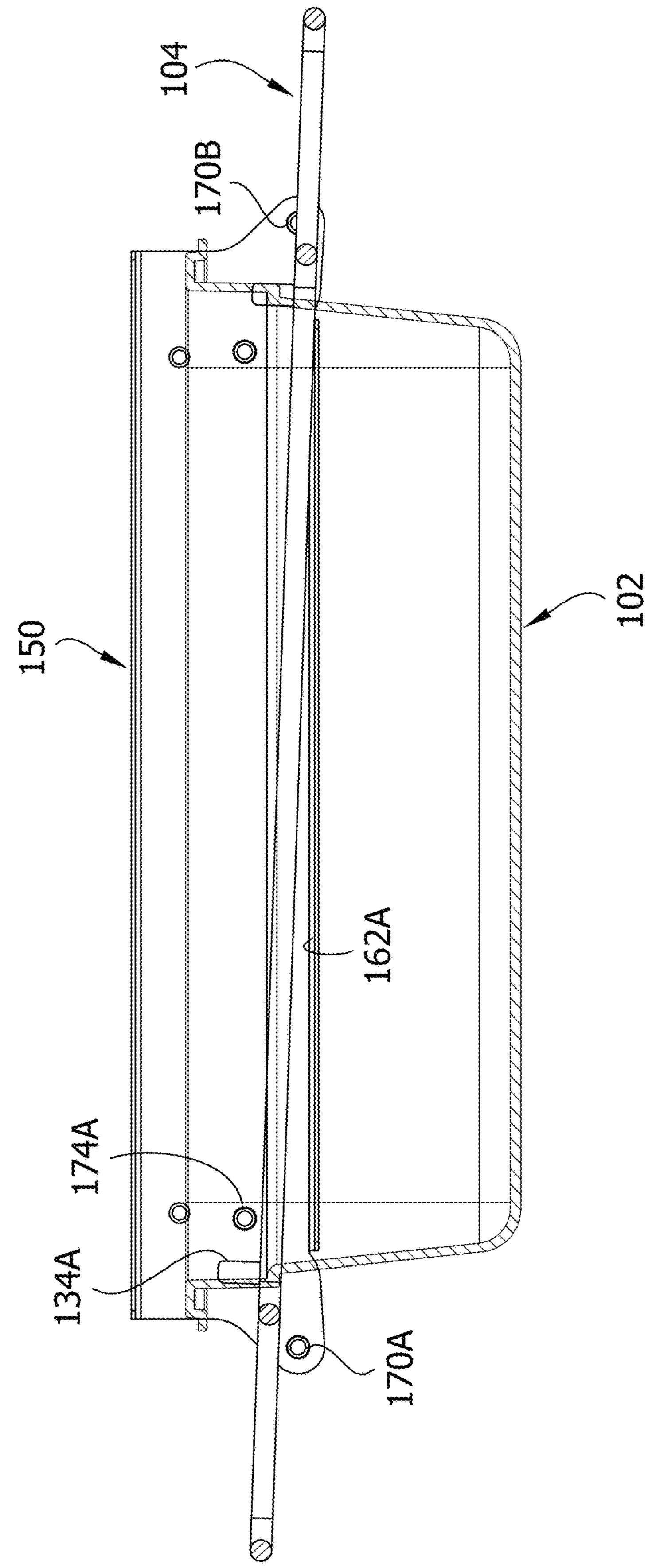
FIG. 7 is a cross-section similar to FIG. 6 taken through the pan transporter and the pan but showing a front end of the pan transporter lifted upward.
Figure 8:
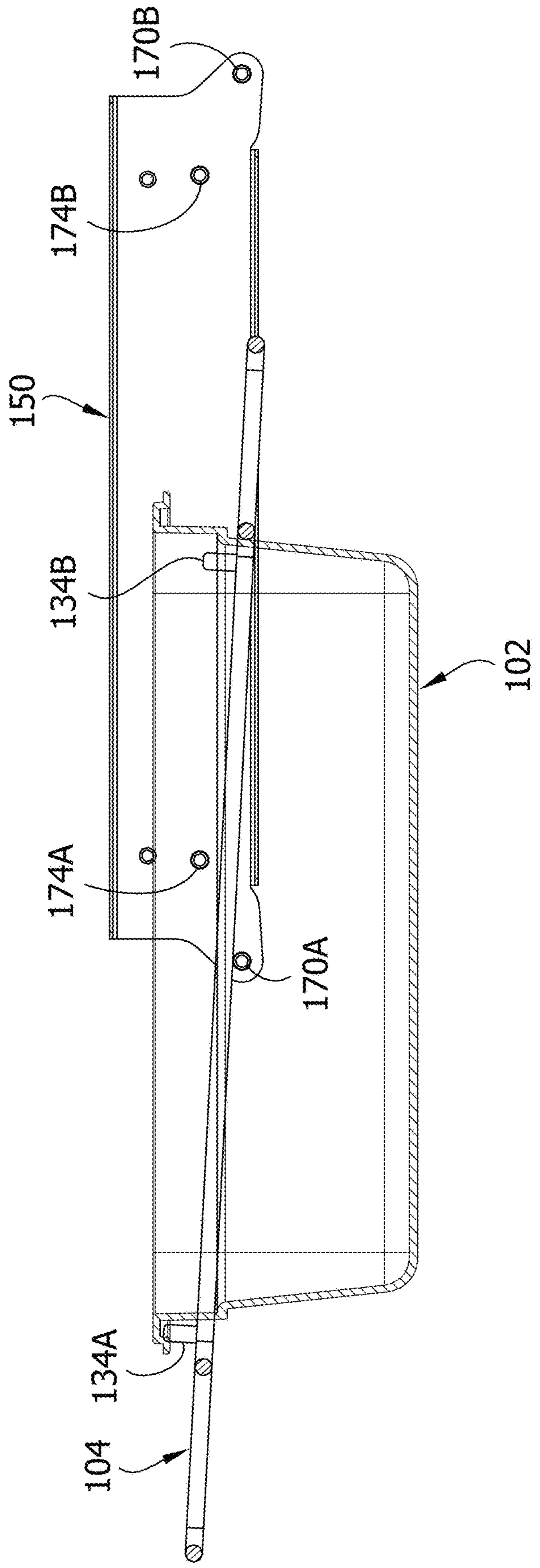
FIG. 8 is a cross-section similar to FIG. 7 taken through the pan transporter and the pan showing the pan transporter and the pan moved from the stowed position toward an extended or access position.
Figure 12:
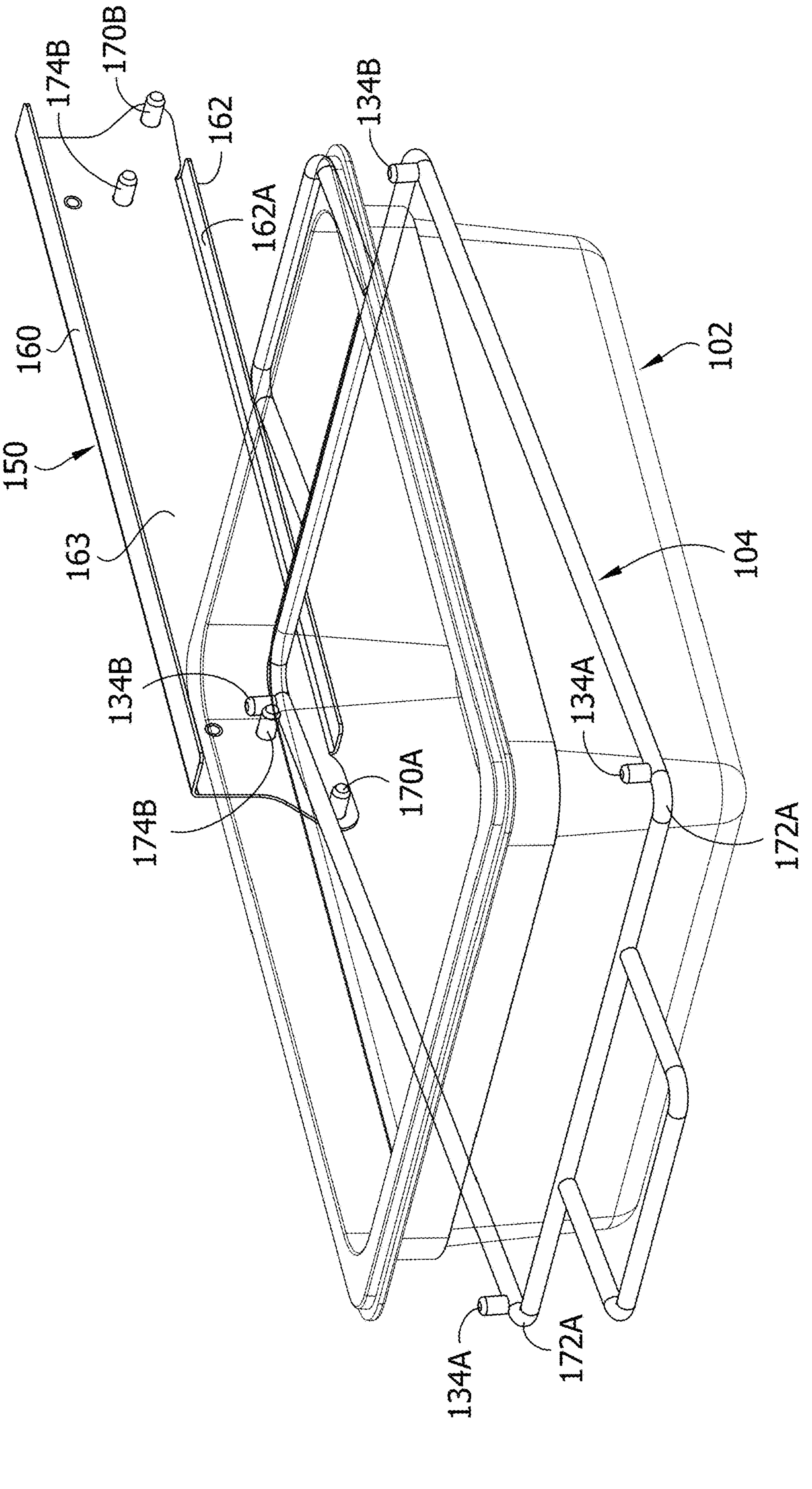
FIG. 12 is a perspective of the pan transporter, the pan, and the support of the holding unit, with the pan transporter and the pan in the extended or access position.
Figure 13:
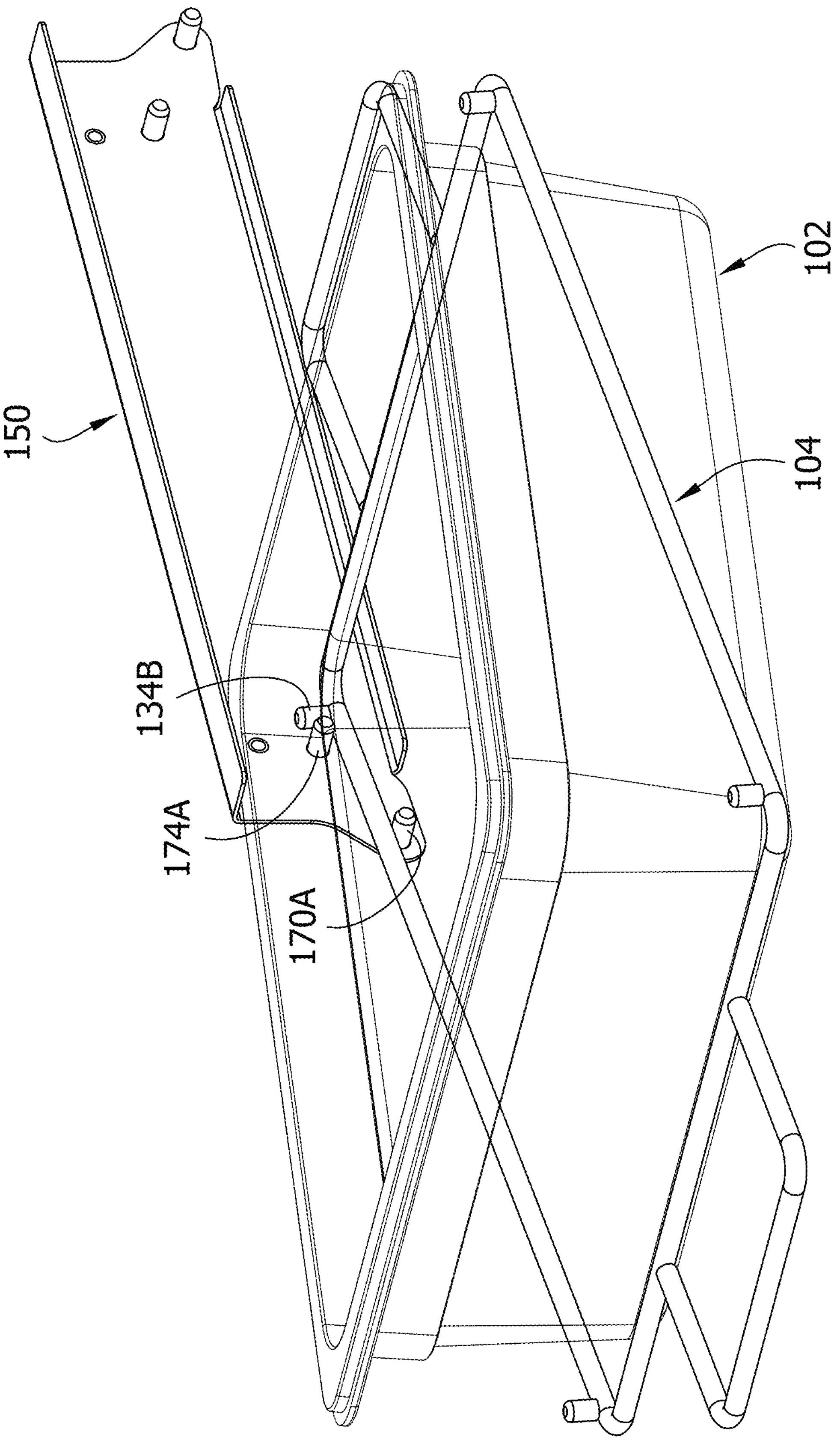
FIG. 13 is a perspective of the pan transporter, the pan, and the support of the holding unit, with the pan being tilted for removing the pan from the pan transporter.
Figure 14:
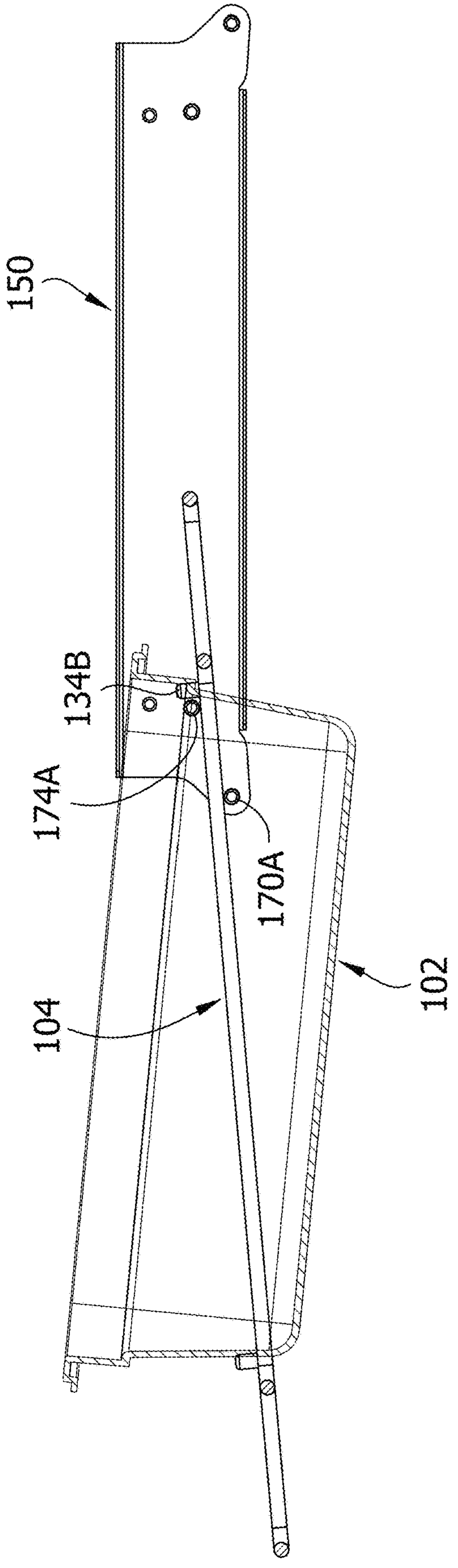
FIG. 14 is a cross-section taken through FIG. 13.

Referring to FIGS. 7, 8, 12, and 13, the pan transporter is configured to move to an extended position (FIGS. 12 and 13). In the extended position, the open top of the pan 102 is accessible to place food into the pan and/or remove food from the pan. As shown by comparison of FIGS. 6 and 7, to move the pan transporter 104 and the pan 102 from the stowed position to the extended position, the user lifts the end of the pan transporter up, to clear the stow stop 170A (e.g., move the engagement surfaces 172A of the pan transporter clear of the stow stops 170A). The user then moves the pan transporter 104 (which moves the pan 102) in the forward direction. A similar technique can be used for raising and then moving the transporter 104 and pan 102 toward the rearward extended position.

The stops 134A, 134B of the pan transporter 104 are configured to engage extension stops 174A, 174B of the support 150 to position the pan transporter and the pan 102 in the extended position. In the illustrated embodiment, the pan transporter 104 includes rear transporter stops 134B to position the pan transporter 104 in an extended position when the pan transporter is moved in a forward direction and forward transporter stops 134A to position the pan transporter in an extended position when the pan transporter is moved in a rearward direction. Similarly, each support 150 includes a front extension stop 174A and a rear extension stop 174B. The front extension stops 174A engage the rear transporter stops 134B to position the pan transporter 104 in the extended position, when the pan transporter is moved in a forward direction. The rear extension stops 174B engage the front transporter stops 134A to position the pan transporter in the extended position, when the pan transporter is moved in a rearward direction. The pan transporter 104 can move in a forward direction to move to an extended position in the front of the holding unit 100 or move in a rearward direction to move to an extended position in the rear of the holding unit.

Referring to FIGS. 12 and 13, the pan transporter 104 is shown in the extended position. In the extended position, the user has pulled the pan transporter 104 generally out of the holding unit 100 such that the pan 102 is accessible to the user. When in the extended position, movement of the pan transporter 104 toward the user (e.g., either forward or rearward) is restricted by the extension stops 174A, 174B. Movement back into the holding unit 100, however, is not restricted, thus making it possible for the user to return the pan transporter 104 back to the stowed position. In addition, when the pan transporter 104 is in the extended position, the pan transporter is tilted downward with respect to horizontal about the stow stops 170A. As the pan transporter 104 moves forward from the stowed position to the extended position, the orientation of the pan transporter may change from being angled upward to horizontal to angled downward as the pan transporter pivots about the stow stops 170A.

In the stowed position, the transporter stops 134A, 134B are not horizontally aligned (broadly, in stopping registration) with the extension stops 174A, 174B. This allows the transporter stops 134A, 134B to move past the extension stops, when the pan transporter is being moved from the stowed position to the extended position. For example, the rear transporter stops 134B move past the rear extension stops 174B when the pan transporter 104 is being moved to the extended position in a forward direction. However, as the pan transporter 104 tilts downward about the stow stops 170A when moving forward to the extended position, the rear transporter stops 134B are raised, bringing them into horizontal alignment and eventual contact with the extension stops 174A. It will be appreciated that in the illustrated embodiment the transporter 104 is lower than the extension stops 174A, 174B. The extension stops 174A, 174B are above the transporter 104 when the transporter is in the stowed position. The extension stops 174A, 174B are above the flange 162 and are intersected by a vertical plane that also intersects the flange 162. In the stowed position, the webs 163 are laterally outboard of the transporter 104.

When the pan transporter 104 is in the extended position, the pan transporter also engages the undersides of a pair of the extension stops 174A, 174B. For example, in the forward extended position, the pan transporter 104 engages the undersides of the forward extension stops 174A. This sets the downward angle of the pan transporter in the extended position. The engagement of the pan transporter 104 with the stow stops 170A and the underside of the extension stops 174A also creates a moment couple that holds the pan transporter and the pan 102 in the extended position. In the illustrated extended position, the pan transporter 104 supports one end (e.g., a forward end) of the pan 102 with the other end (e.g., a rearward end) still being supported by the floor 140. In other embodiments, the pan 102 may be fully supported by the pan transporter or the pan may be supported in some other manner when in the extended position.

Referring to FIGS. 12 and 13, the user is able to remove the pan 102 from the pan transporter 104 (or install the pan in the transporter) when the pan transporter is in the extended position. When the pan transporter 104 is extended and angled downward, the pan transporter creates enough space to permit the pan 102 to be inserted or removed from the body of the transporter. By allowing the pan 102 to be removed from the pan transporter 104, the pan can be cleaned more easily and can be moved around the kitchen/workplace to transport food items easily.

Figure 9:
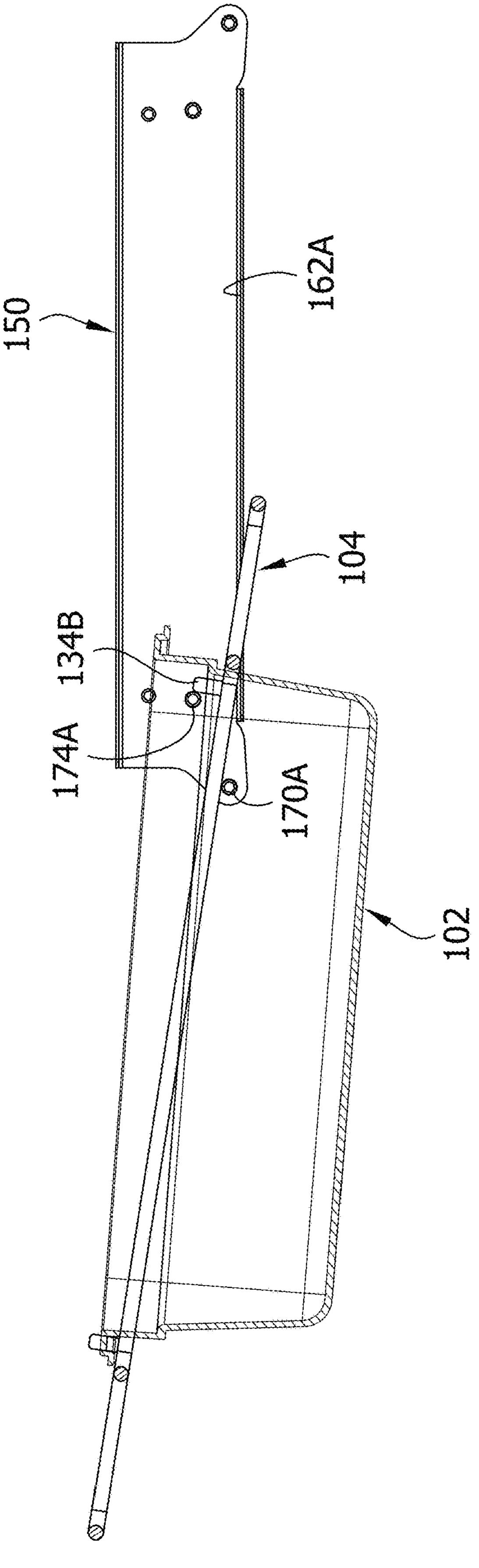
FIGS. 9-11 are cross-sections similar to FIG. 8 taken though the pan transporter and the pan showing a process for removing the pan transporter from the food holding unit.
Figure 10:
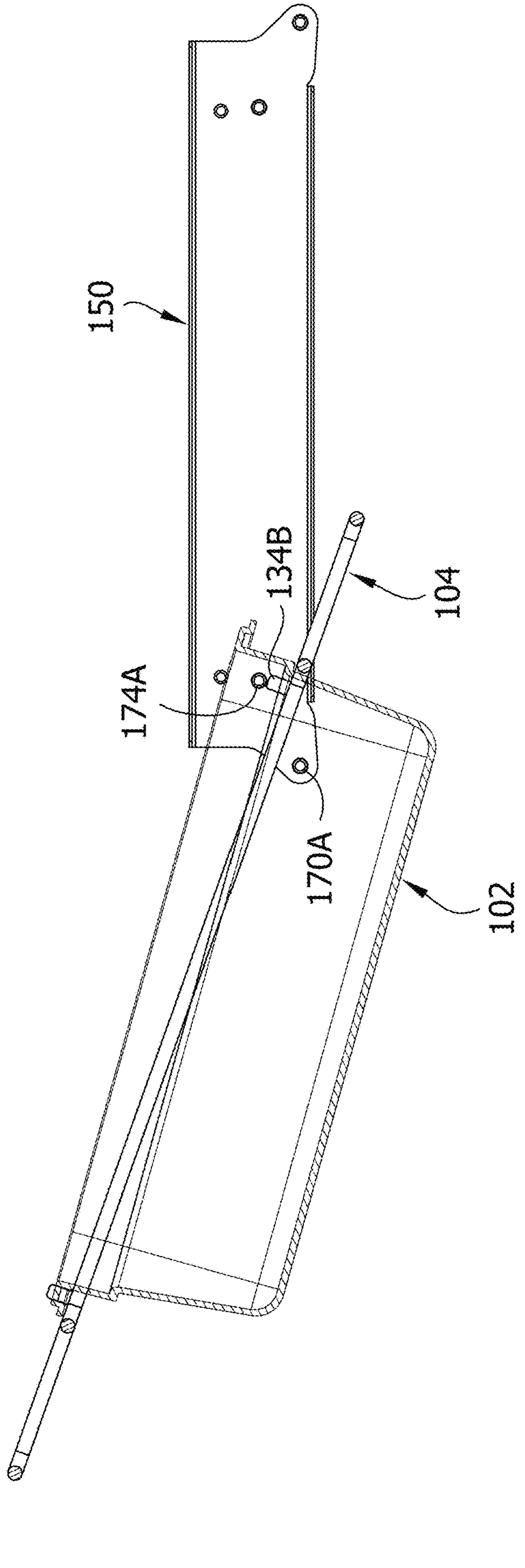
Figure 11:
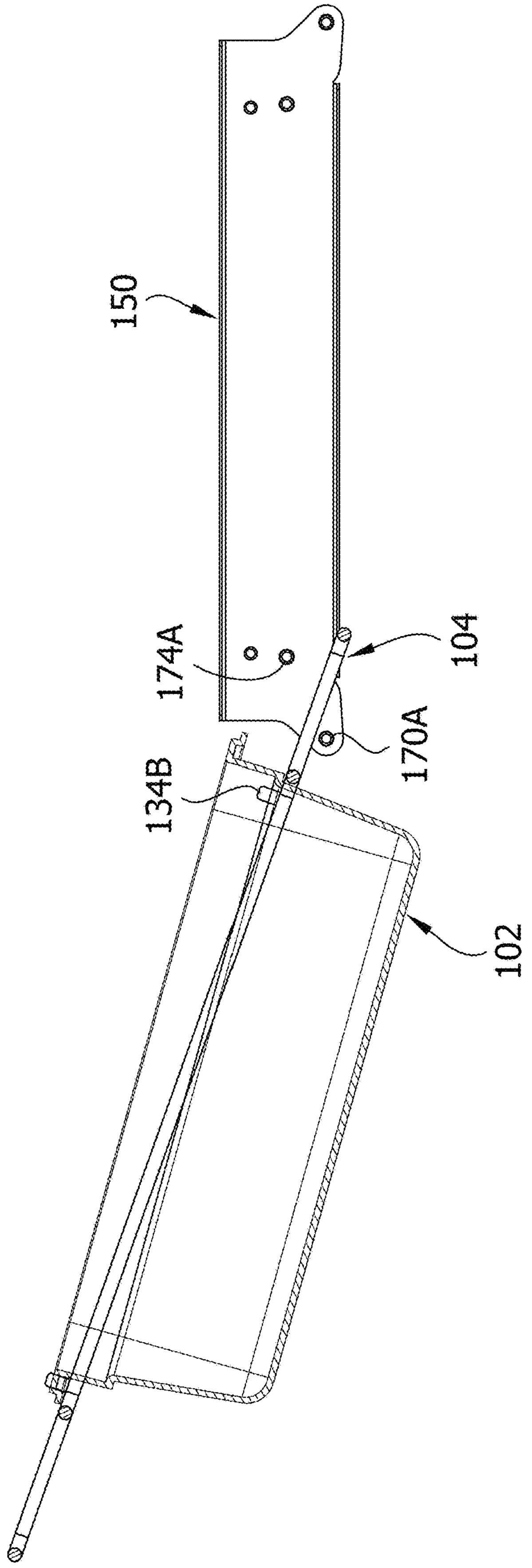

As shown by comparison of FIGS. 9 and 10, the pan transporter 104 can be tilted upward by the user (about the stow stops 170A) to disconnect the pan transporter from the supports 150. The pan transporter 104 is tilted upward to allow the upper free ends of the transporter stops 134B to pass under the extension stops 174A. When the transporter stops 134B have been moved below (broadly, out of stopping registration with) the extension stops 174B, forward movement of the pan transporter 104 is no longer restricted by the extension stops 174B, and the transporter 104 and pan 102 can be moved forward. The transporter 104 can be removed in a similar fashion if no pan 102 is in the transporter. Moreover, the transporter 104 can be removed from the rear side of the holding unit 100 in a similar manner.

After removal of the pan transporter 104, the pan transporter can be reinserted into the pan channel 152 and moved back into the stowed position by performing the actions described above in reverse. By tilting the pan transporter 104 upward with respect to horizontal, the user can insert the pan transporter into the pan channel 152 and along the lower flanges 162 in such a way that the transporter stops 134B are below the extension stops 174A. The user can then support the pan transporter 104 on the stow stops 170A and insert the pan transporter farther into the holding unit 100.

The holding unit 100 is configured to allow the pan transporter 104 and the pan 102 to be removed via the same actions as described above from the front and rear of the holding unit.

It will be apparent that modifications and variations are possible without departing from the scope of the invention defined in the appended claims. Dimensions and proportions described herein are by way of example without limitation. Other dimensions and proportions can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A food holding apparatus comprising:

a food holding unit including a floor and a holding space, the floor bounding a bottom of the holding space, the food holding unit including a support in the holding space, the support including a transporter support surface;

a pan transporter configured to be supported by the support, the pan transporter having a forward end and an opposite rearward end, the pan transporter having a transporter surface; and a pan sized and shaped to be supported by the pan transporter such that movement of the pan transporter relative to the food holding unit results in corresponding movement of the pan relative to the food holding unit;

the pan transporter being slidable between a stowed position and an extended position, wherein in the stowed position;

the pan transporter is supported by the transporter support surface, the transporter surface of the pan transporter being engaged with and resting on the transporter support surface of the support; and the pan transporter is arranged relative to the holding space such that the pan is disposed in the holding space when the pan is supported by the pan transporter;

the transporter surface of the pan transporter being arranged to ride on the transporter support surface of the support as the pan transporter slides between the stowed and extended positions, the transporter surface of the pan transporter being static relative to the forward and rearward ends of the pan transporter as the pan transporter slides between the stowed and extended positions.

2. The food holding apparatus of claim 1, wherein the food holding unit includes a ceiling bounding a top of the holding space, the support being suspended from the ceiling.

3. The food holding apparatus of claim 1, wherein the support is spaced apart from the floor.

4. The food holding apparatus of claim 1, wherein the pan bounds an interior for holding food, the interior having an open top, and wherein the support includes a partition disposed in the holding space, the partition being arranged such that a plane coplanar with the open top of the interior of the pan intersects the partition when the pan is supported by the pan transporter and the pan transporter is in the stowed position.

5. The food holding apparatus of claim 4, wherein the partition comprises sheet metal.

6. The food holding apparatus of claim 1, wherein the support is irremovably fixed in position relative to the holding space.

7. The food holding apparatus of claim 1, wherein the pan transporter includes a transporter stop and the support includes a first stop and a second stop, wherein the first stop of the support is arranged to position the pan transporter in the stowed position, and wherein the second stop of the support is arranged to engage the transporter stop of the pan transporter to position the pan transporter in the extended position.

8. The food holding apparatus of claim 1, wherein the support is a first support, and wherein the food holding unit includes a second support configured to support the pan transporter.

9. The food holding apparatus of claim 8, wherein the first support includes a first stop extending inward, toward the second support, from a remainder of the first support, and wherein the first stop of the first support is arranged to engage the pan transporter to position the pan transporter in the extended position.

10. The food holding apparatus of claim 1, wherein the pan transporter includes a forward handle and a rearward handle, the forward handle forming the forward end of the pan transporter, and the rearward handle forming the rearward end of the pan transporter.

11. A food holding apparatus comprising:

a food holding unit including a floor and a support, the support including a transporter support surface and a first stop, the first stop being disposed above an elevation of the transporter support surface;

a pan transporter movable relative to the food holding unit between a stowed position and an extended position, the pan transporter resting on the transporter support surface when the pan transporter is in the stowed position, the first stop of the support being arranged to engage the pan transporter to position the pan transporter in the stowed position; and a pan sized and shaped to be supported by the pan transporter such that movement of the pan transporter relative to the food holding unit between the stowed and extended positions results in corresponding movement of the pan relative to the food holding unit.

12. The food holding unit of claim 11, wherein the support includes a second stop arranged to engage the pan transporter to position the pan transporter in the extended position, the second stop overlying the transporter support surface.

13. The food holding unit of claim 12, wherein the pan transporter is disposed below an elevation of the second stop when the pan transporter is in the stowed position.

14. The food holding unit of claim 12, wherein the pan transporter includes a transporter stop and a handle, the transporter stop being arranged to engage the second stop of the support to position the pan transporter in the extended position, the handle being disposed below an elevation of the transporter stop.

15. The food holding unit of claim 14, wherein the transporter stop defines an upper-most portion of the pan transporter.

16. The food holding unit of claim 14, wherein the transporter stop includes an upper free end.

17. A food holding apparatus comprising:

a food holding unit including a floor and a support, the support including a first stop;

a pan transporter movable relative to the food holding unit and configured to be supported by the support, the pan transporter including a stop engagement surface and a handle, the pan transporter being movable to a first position relative to the food holding unit, the first stop of the support being arranged to engage the stop engagement surface of the pan transporter to position the pan transporter in the first position, the stop engagement surface and the handle being arranged relative to one another such that a plane parallel to the floor when the pan transporter is in the first position intersects the stop engagement surface and the handle;

a pan sized and shaped to be supported by the pan transporter such that movement of the pan transporter relative to the food holding unit results in corresponding movement of the pan relative to the food holding unit.

18. The food holding apparatus of claim 17, wherein the pan transporter includes a front segment, a rear segment, a left side segment and a right side segment, the front, rear, left side and right side segments bounding an opening sized and shaped to receive the pan, the plane intersecting each of the front, rear, left side and right side segments.

19. The food holding apparatus of claim 17, wherein the pan transporter includes a transporter body bounding an opening sized and shaped to receive the pan, the transporter body comprising a single wire form.

* * * * *